US012756676B2

(12) United States Patent
Musleh et al.

(10) Patent No.: US 12,756,676 B2
(45) Date of Patent: Oct. 6, 2026

(54) CACHE ALLOCATION SYSTEM

(71) Applicant: Intel Corporation, Santa Clara, CA (US)

(72) Inventors: Malek Musleh, Portland, OR (US); Tony Hurson, Austin, TX (US); Pedro Yebenes Segura, San Jose, CA (US); Allister Alemania, North Plains, OR (US); Roberto Penaranda Cebrian, Santa Clara, CA (US); Ayan Banerjee, Bengaluru (IN); Robert Southworth, Chatsworth, CA (US); Sujoy Sen, Beaverton, OR (US); Curt E. Bruns, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 17/384,627

(22) Filed: Jul. 23, 2021

(65) Prior Publication Data

US 2021/0359955 A1 Nov. 18, 2021

(51) Int. Cl.

| | |
|---|---|
| ***H04L 49/90*** | (2022.01) |
| ***G06F 15/173*** | (2006.01) |
| ***H04L 47/762*** | (2022.01) |
| ***H04L 47/78*** | (2022.01) |
| ***H04L 47/80*** | (2022.01) |

(52) U.S. Cl.

CPC ........ *H04L 49/90* (2013.01); *G06F 15/17331* (2013.01); *H04L 47/762* (2013.01); *H04L 47/781* (2013.01); *H04L 47/805* (2013.01)

(58) Field of Classification Search

CPC ... H04L 47/781; H04L 47/762; H04L 47/805; H04L 49/90; G06F 15/17331

See application file for complete search history.

(56) References Cited

U.S. PATENT DOCUMENTS

| | | | | |
|---|---|---|---|---|
| 7,720,930 | B2 | 5/2010 | Minturn | |
| 8,619,790 | B2 * | 12/2013 | Pong | H04L 45/7453 711/3 |
| 10,951,525 | B2 | 3/2021 | Vasudevan | |
| 11,297,171 | B2 * | 4/2022 | Chun | H04L 69/163 |

(Continued)

FOREIGN PATENT DOCUMENTS

| | | |
|---|---|---|
| CN | 108156172 A | 6/2018 |
| KR | 1020210030073 A | 3/2021 |

OTHER PUBLICATIONS

Cai, Qingchao et al., "Efficient Distributed Memory Management with RDMA and Caching", Aug. 2018, Rio de Janeiro, Brazil, Proceedings of the VLDB Endowment, vol. 11, No. 11, 14 Pages.

(Continued)

*Primary Examiner* — Hassan A Phillips
*Assistant Examiner* — Sang C Lee
(74) *Attorney, Agent, or Firm* — Compass IP Law PC

(57) ABSTRACT

Examples described herein relate to a network interface device comprising: a host interface, a direct memory access (DMA) engine, and circuitry to allocate a region in a cache to store a context of a connection. In some examples, the circuitry is to allocate a region in a cache to store a context of a connection. In some examples, the circuitry is to allocate a region in a cache to store a context of a connection based on expected length of runtime of the connection and the expected length of runtime of the connection.

20 Claims, 12 Drawing Sheets

(56) References Cited

U.S. PATENT DOCUMENTS

| | | | | |
|---|---|---|---|---|
| 11,327,890 | B1 * | 5/2022 | Mukherjee | G06F 12/0897 |
| 11,513,958 | B1 * | 11/2022 | Mukherjee | G06F 12/0804 |
| 2002/0026502 | A1 * | 2/2002 | Phillips | H04L 65/40 709/219 |
| 2004/0010612 | A1 * | 1/2004 | Pandya | H04L 69/326 709/213 |
| 2005/0100042 | A1 | 5/2005 | Illikkal | |
| 2006/0072562 | A1 | 4/2006 | King | |
| 2006/0092934 | A1 | 5/2006 | Chung et al. | |
| 2006/0136570 | A1 | 6/2006 | Pandya | |
| 2006/0274787 | A1 * | 12/2006 | Pong | H04L 69/12 370/469 |
| 2009/0132767 | A1 | 5/2009 | Gao et al. | |
| 2013/0019053 | A1 | 1/2013 | Somanache et al. | |
| 2016/0142308 | A1 | 5/2016 | Gage et al. | |
| 2017/0187496 | A1 * | 6/2017 | Shalev | H04L 45/24 |
| 2017/0187621 | A1 * | 6/2017 | Shalev | H04L 45/745 |
| 2017/0187846 | A1 * | 6/2017 | Shalev | H04L 1/1835 |
| 2017/0237656 | A1 | 8/2017 | Gage | |
| 2018/0302410 | A1 | 10/2018 | Venkataraman et al. | |
| 2018/0314521 | A1 | 11/2018 | Chen et al. | |
| 2018/0373633 | A1 * | 12/2018 | Herdrich | G06F 12/0811 |
| 2019/0042388 | A1 * | 2/2019 | Wang | G06F 12/084 |
| 2020/0210340 | A1 * | 7/2020 | Zhang | G06F 12/0842 |

OTHER PUBLICATIONS

Chen, Tien-Fu, "Data Prefetching for High-Performance Processors", Technical Report 93-07-01, Department of Computer Science and Engineering University of Washington, Seattle, WA 98195 Jul. 1993, 158 pages.

First Office Action for U.S. Appl. No. 16/383,591, Mailed Jul. 9, 2020, 14 pages.

Intel, "Intel Data Direct I/O Technology (Intel DDIO): A Primer", Technical Brief, Feb. 2012, Revision 1.0, 11 pages.

Notice of Allowance for U.S. Appl. No. 16/383,591, Mailed Oct. 28, 2020, 9 pages.

Parate, Abhinav, et al., "Practical Prediction and Prefetch for Faster Access to Applications on Mobile phones", Sep. 2013 ACM, 10 pages.

Schuehler, David Vincent, "Techniques for Processing TCP/IP Flow Content in Network Switches at Gigabit Line Rates", Report No. WUCSE-2004-72, Dec. 2004, All Computer Science and Engineering Research, Washington University in St. Louis, Washington University Open Scholarship, USA, 265 pages.

Soundararajan, Gokul, et al., "Context-Aware Prefetching at the Storage Server", downloaded from https://www.usenix.org/legacy/event/usenix08/tech/full_papers/soundararajan/soundararajan_html/index.html, Oct. 8, 2020, 25 pages.

Arbezzano, Gianluca, "OpenTracing: An Open Standard for Distributed Tracing", https://thenewstack.io/opentracing-open-standard-distributed-tracing/, Oct. 10, 2017, 7 pages.

Bhagyashree et al., "Comparison of Cache Replacement Policies using GEM5 Simulator", https://people.csail.mit.edu/emer/papers/2010.06.isca.rrip.pdf, Jun. 2010, 24 pages.

Brondolin, Rolando and Santambrogio, Marco D., "A Black-box Monitoring Approach to Measure Microservices Runtime Performance", ACM Trans. Archit. Code Optim., vol. 17, No. 4, Article 34, https://dl.acm.org/doi/fullHtml/10.1145/3418899, Nov. 2020, 10 pages.

Charter Global, "Five Microservices Trends in 2020", https://www.charterglobal.com/five-microservices-trends-in-2020/, Apr. 7, 2020, 5 pages.

DPDK, "What is DPDK?", https://www.packetflow.co.uk/what-is-dpdk/, Aug. 2017, 2 pages.

Gan, Yu et al., "An Open-Source Benchmark Suite for Microservices andtheir Hardware-Software Implications for Cloud and Edge Systems", http://microservices.ece.cornell.edu/, ASPLOS 2019, 35 pages.

Intel® Resource Director Technology (Intel® RDT), "Unlock System Performance In Dynamic Environments", https://www.intel.com/content/www/us/en/architecture-and-technology/resource-director-technology.html, Downloaded from Internet Aug. 15, 2023, 4 pages.

Jaleel, Aamer et al., "High Performance Cache Replacement Using Re-Reference Interval Prediction (RRIP)", https://safari.ethz.ch/architecture/fall2017/lib/exe/fetch.php?media=p60-jaleel.pdf, ISCA'10, Jun. 19-23, 2010, Saint-Malo, France, 12 pages.

Kandemir, Mahmut et al., "Multilayer Cache Partitioning for Multiprogram Workloads", https://www.researchgate.net/publication/220767507_Multilayer_Cache_Partitioning_for_Multiprogram_Workloads, Euro-Par 2011 Parallel Processing, pp. 130-141.

Kaur, Rajwinder, "IPv4 Header", https://advancedinternettechnologies.wordpress.com/ipv4-header/, 2009.

Kloda, Dr. Tomasz, "Static timing analysis for CPU caches with new replacement policies", http://people.csail.mit.edu/emer/papers/2007.06.isca.dip.pdf, Jun. 2007, 2 pages.

Kozhikkottu, Vivek et al., "Variation Aware Cache Partitioning for Multithreaded Programs", DAC 2013, Jun. 1-5, 2014, San Francisco, CA, USA, 6 pages.

Kubernetes, "Production-Grade Container Orchestration", https://kubernetes.io/, Downloaded from internet Aug. 16, 2023, 3 pages.

Li, Yuliang et al., "HPCC: High Precision Congestion Control", https://liyuliang001.github.io/publications/hpcc.pdf, SIGCOMM '19, Aug. 19-23, 2019, Beijing, China, 15 pages.

Miao, Rui et al., "HPCC++: Enhanced High Precision Congestion Control draft-pan-tsvwg-hpccplus-02", https://tools.ietf.org/id/draft-pan-tsvwg-hpccplus-01.html, Sep. 11, 2020, 28 pages.

Montazeri, Behnam et al., "Homa: A Receiver-Driven Low-Latency Transport Protocol Using Network Priorities", https://people.csail.mit.edu/alizadeh/papers/homa-sigcomm18.pdf, SIGCOMM '18, Aug. 20-25, 2018, Budapest, Hungary, 15 pages.

Musleh, Malek R., "Optimizing Memory Performance for Scientific and Mobile Applications", https://search.proquest.com/openview/647641369da368d55fca69a06c74bdf9/1?cbl=18750&diss=y&pq-origsite=gscholar, Purdue University ProQuest Dissertations Publishing, Aug. 2015, 24 pages.

Nguyen, Khang T., "Introduction to the Intel® Resource Director Technology Features in Intel® Xeon® Processors E5 v4", https://www.intel.com/content/www/us/en/developer/articles/technical/introduction-to-the-intel-resource-director-technology-features-in-intel-xeon-processors-e5.html, 2016, 3 pages.

ntop.org, "RTT Monitor", https://www.ntop.org/guides/ntopng/active_monitoring/rtt_monitor.html, © Copyright 2020, 3 pages.

Pan, Abhisek and Pai, Vijay S., "Imbalanced Cache Partitioning for Balanced Data-Parallel Programs", MICRO '46, Dec. 7-11, 2013, Davis, CA, USA, 13 pages.

Pan, Abhisek and Pai, Vijay S., "Runtime-Driven Shared Last-Level Cache Management for Task-Parallel Programs", https://dl.acm.org/doi/pdf/10.1145/2807591.2807625, SC '15, Nov. 15-20, 2015, Austin, TX, USA, 12 pages.

Project ACRN, "RDT Allocation Feature Supported by Hypervisor", https://projectacrn.github.io/1.6/developer-guides/hld/hv-rdt.html, Last Updated Apr. 1, 2020, 7 pages.

Red Hat, "What is Jaeger?", https://www.redhat.com/en/topics/microservices/what-is-jaeger, Nov. 11, 2019, 3 pages.

Shkuro, Yuri, "Take OpenTracing for a HotROD ride", https://medium.com/opentracing/take-opentracing-for-a-hotrod-ride-f6e314117941, May 6, 2017, 28 pages.

Singhvi, Arjun et al., "1RMA: Re-envisioning Remote Memory Access for Multi-tenant Datacenters", https://research.google/pubs/pub49377/, SIGCOMM '20, Aug. 10-14, 2020, Virtual Event, NY, USA, 14 pages.

Soundararajan, Gokul et al., "Dynamic Partitioning of the Cache Hierarchy in Shared Data Centers", http://www.eecg.toronto.edu/~amza/papers/vldb08.pdf, VLDB '08, Aug. 24-30, 2008, Auckland, New Zealand, 12 pages.

Vaughan-Nichols, Steven, "What is Docker and why is it so darn popular?", https://www.zdnet.com/article/what-is-docker-and-why-is-it-so-darn-popular/, Mar. 21, 2018, 10 pages.

Wu, Carole-Jean et al., "SHIP: Signature-based Hit Predictor for High Performance Caching", https://mrmgroup.cs.princeton.edu/papers/MICRO11_SHiP_Wu_Final.pdf, MICRO '11, Dec. 3-7, 2011, Porto Alegre, Brazil, 12 pages.

(56) References Cited

OTHER PUBLICATIONS

Zhu, Yibo et al., "Congestion Control for Large-Scale RDMA Deployments", https://conferences.sigcomm.org/sigcomm/2015/pdf/papers/p523.pdf, SIGCOMM '15, Aug. 17-21, 2015, London, United Kingdom, 14 pages.
International Search Report and Written Opinion for PCT Patent Application No. PCT/US22/22031, Mailed Jun. 30, 2022, 11 pages.

* cited by examiner

CACHE ALLOCATION SYSTEM

Cloud Service Providers (CSPs) are shifting application development, from monolithic applications towards microservices to enable faster and more flexible iterative improvements in software, deployment, and development. A microservice is constructed as a unique connection session (e.g., same source internet protocol (IP) address, source port, destination IP address, destination port, and Hypertext Transfer Protocol (HTTP) path, except for a unique client port).

In the context of remote direct memory access (RDMA), communications for utilize Queue-Pairs (QPs), which represent a connection between two physical endpoints (NICs). A unique QP with send queues, receive queues, and completion queues (CQ) can be utilized per microservice in the context of RDMA. When a connection (QP) is created and while it remains active, the sender and receiver hosts maintain information such as which and how many Transmit and Receive Queues can be used; which Congestion Control (CC) protocol; the Completion Queue; and Memory Regions (MR) associated with a given QP. Connection state for RDMA-enabled network interface controllers (NICs) can include media access control (MAC) addresses, Internet Protocol (IP) addresses, RDMA over Converged Ethernet (RoCE) packet sequence number (PSN), and current connection state.

Flow or connection state of a QP can be stored in a cache. However, due to a limited size of a cache and other contending uses of the cache beyond context, connection state may not be in the cache. If there is a cache miss of a flow or connection context, from either lack of capacity or conflict miss, a packet processing action can be stalled until the context can be fetched from host memory which can increase latency or time to completion of packet processing and the microservice. As a result, a workloads' performance can violate applicable quality of service (QoS) or service-level-agreement (SLA) parameters.

Flow-state meta-data can be maintained for an active connection during the duration of active transmission of network packets between executing microservices. As the workloads become increasingly complex and are deployed on larger systems as well as an increase in disaggregation of microservice execution, a number of active network connections for which network state is maintained is growing and cache devices may not have sufficient space to store connection state.

DETAILED DESCRIPTION

Figure 1:
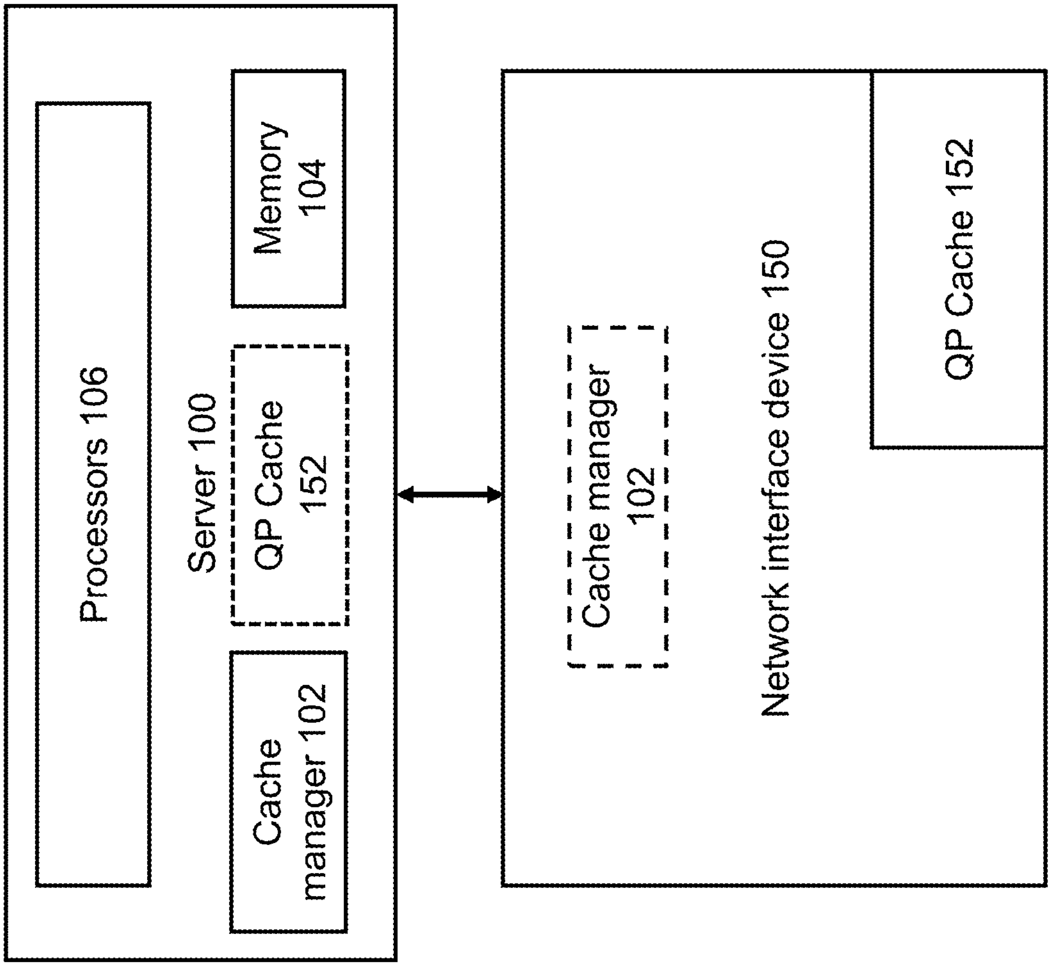
FIG. 1 depicts an example system.

FIG. 1 depicts an example system. Various examples of components of network interface device 150 and server 100 (e.g., memory 104 and processors 106) are provided herein with respect at least to FIGS. 11 and 12 respectively. In some examples, cache manager 102 can manage utilization of QP cache 152 to store or evict contexts and/or data associated with one or more QPs as described herein. A QP can represent a connection between a source endpoint and a destination endpoint. Although reference is made to storage or eviction of contexts and/or data associated with one or more QPs, connections other than RDMA can be used and contexts and data are not limited to RDMA QPs. Cache manager 102 can be implemented in one or both of server 100 and network interface device 150.

QP cache 152 can be structured as a direct-mapped cache, 2-way set associative cache, 4-way associative cache, or other organizations. QP cache 152 can store contexts and/or related data for active connections between network interface device 150 and another network interface device. In some examples, QP cache 152 can be provisioned within a cache of server 100 and/or network interface device 150. QP cache 152 can be part of a Level-1 (L1) cache, Level-2 (L2) cache, Level-3 (L3) cache or Last Level Cache (LLC), or a volatile or non-volatile memory. A connection or flow context can be stored in QP cache 152 that is accessible to network interface device 150 and/or server 100.

Non-limiting examples of context can include connection state and include one or more of: a Queue Pair connection context (e.g., most recently received packet sequence number and next expected received packet sequence number), a shared Receive Queue (RQ) context (e.g., current producer (tail) index associated with pointer in RQ in which a descriptor can be written, current consumer (head) index associated with pointer in RQ in which a descriptor can be read), a Completion Queue (CQ) context (e.g., current producer (tail) index associated with pointer in CQ in which a descriptor can be written, current consumer (head) index associated with pointer in CQ in which a descriptor can be read), a Memory Region context (e.g., data structure that defines the starting address and extent (size) of application data buffer region in host memory and access rights (e.g., local, remote, read, write), Physical Buffer Lists context (e.g., physical page addresses associated with a memory region), work queue entry (WQE) context (e.g., type of message to be transmitted (e.g., RDMA read, RDMA write, RDMA send/receive), total size of message, references to source and/or destination memory region that data is to be sourced-from or sunk-to).

Cache manager 102 can determine a manner to store contexts of a connection, socket, or flow in the cache as number of exclusive ways, number of shared ways, or no cache space for at least one application or at least queue pair. A socket can be identified by an IP Address and port session identifier or listening state and/or Queue Pair identifier. A packet flow can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

Cache manager 102 can determine a manner to store contexts in QP cache 152 based on various factors. Factors to determine whether to allocate a region of QP cache 152 to store a context or not to allocate a region of QP cache 152 to store a context include one or more of: connection type (e.g., reliable or unreliable connection), content transmitted (e.g., latency sensitive network congestion notifications payload and ACKs), length of runtime of a connection and associated microservice, and/or priority or applicable SLA (such as performance guarantees of minimal run-to-run variability or bounded worst-case).

In some examples, an operating system kernel or hypervisor can assign a Resource Manager Identifier (RMID) value to an application and/or context based on whether a context is associated with congestion information, reliability of connection, based on historic amount of time a context is stored in a cache, SLA or priority level associated with a microservice (and communicated by the microservice), or other factors. Allocation of one or more ways or other portion of a cache to store a context can be performed based on the assigned RMID value. A cache way or ways can be partitioned and allocated to store contexts associated with one or more RDMA QPs. Note that a single QP connection between any two devices (e.g., severs, network interface devices, accelerators, memory devices, storage devices, and so forth) can aggregate communications of one or more microservices. In some examples, a maximum number of ways allocated to a connection context for one or more microservices can be several ways available within a cache or cache partition. Exclusive allocation to a cache can isolate a noisy neighbor from affecting cache usage of other neighbors.

In some examples, RMID values can be used to track at least two categories of QPs: (a) those that belong to individual applications(s), processes(s), VM(s), container(s), and (b) transport layer specific QPs that map to network constructs, such as congestion notifications. Multiple different connections can be mapped to the same RMID value in some cases. In some cases, different cache-ways can be assigned to store contexts associated with different RMIDs.

Where an RMID value corresponds to a high priority or highest priority level, one or more exclusive cache ways can be allocated to store the context and associated data. Where an RMID value corresponds to a low priority or lowest priority, no cache way or a shared cache way can be allocated to a context. For example, a context can be treated as a write-no-allocate and read-no-allocate with no cache space allocated to the context so that the context is written-to or read-from memory 104. In addition, or alternatively, as described herein an eviction policy applied to a particular context can be based on RMID value and associated priority level.

In some examples, a higher RMID value can be assigned to a context and associated data associated with a congestion notification payload or acknowledgements (ACKs) to potentially improve predictability of time to react to congestion notifications.

For example, a higher RMID value can be assigned to a context and associated data based on a utilized transport protocol being a reliable transport protocol such as Transmission Control Protocol (TCP), User Datagram Protocol (UDP), quick UDP Internet Connections (QUIC), RDMA over Converged Ethernet (RoCE). However, a lower RMID value can be assigned to a context and associated data associated with an unreliable connected (UC) or unreliable connected datagram (UD).

For example, a length of runtime of a connection and associated microservice can be based on a historic average amount of time the context for the connection was stored in any cache. For example, tracing frameworks such as Jaegger based on OpenTracing can provide time spent executing different microservices to identify a length of operation of a microservice and length of its corresponding connection and context in cache. Time counters can track a length of time a context is stored in the cache. Context usage tracking could be based on an interval period (e.g., round trip-time (RTT)) to provide flexibility in arbitrating among the different microservices on the same QP that do not necessarily coincide during the same active duration. The historic average amount of time the context for the connection was stored in any cache can be tracked by server 100, an orchestrator, hypervisor, operating system (OS), cache manager 102, or other entity.

For example, a higher RMID value can be assigned to a context and associated data for a connection with a longer historic active time. A lower RMID value can be assigned to a context and associated data for a live-once flow that is expected to be short lived. For example, a write-no-allocate and read-no-allocate designation can be made for a context and associated data with no storage in the cache. In a situation where a flow is short-lived (e.g., small message mice flows), it could be disadvantageous to evict another QP context from the cache whose session is live/continues to send/receive network packets. In this case, when the QP context is created/fetched, the context is not stored or allocated in the QP cache.

In some examples, lower RMID values can be assigned to de-prioritize unreliable connections or short-lived connections, provide a partition network constructs (e.g., congestion notifications) into dedicated ways for congestion payloads or ACKs, and provide equal weight between a length of a flow runtime and application input priority level. For example, leveraging the information that a given microservice has taken approximately 15 ms to execute can be used to pre-emptively evict the corresponding QP cache entry, while simultaneously scheduling a prefetch to bring the context into the cache later on before when it is needed again.

For example, a higher RMID value can be assigned to a context and associated data for a microservice with a higher priority level. A lower RMID value can be assigned to a context and associated data for a microservice with a lower priority level. In cases where there are two or more microservices and associated contexts are associated with similar or identical SLA parameters or priority levels, a microservice that is active longer for a longer time can be allocated a higher priority level.

An interface to a driver and/or operating system (OS) executing on server 100 can receive priority or relative priority from an application executed by server 100. For example, the interface can include one or more registers such as at least one Model-Specific Register (MSR). The kernel, hypervisor, virtual machine monitor, or centralized scheduler can use an interface to provide information to network interface device 150 to differentiate between different sets of applications and different queue pairs. Network interface device 150 can utilize a parser or processors to extract application specific information from a packet header, to allow mapping of a priority-level to the given application/process ID, as described herein.

In some examples, cache manager 102 can be implemented using one or more components of an Intel® resource director technology (RDT) device, Advanced Micro Devices, Inc. (AMD) Platform Quality of Service (QoS), or other programmable circuitry to configure certain identifiers such as Resource Manager Identifiers (RMIDs) with specific cache capacity partitions. In some examples, cache manager 102 can be implemented using Intel® Cache Allocation Technology (CAT) or other systems to allocate cache ways in processor caches to applications and associated contexts. CAT can be used to allocate, or partition certain ways of a given cache set to store a context. In some examples, a hypervisor (e.g., KVM, Xen) can allocate cache ways on a per-VM basis to mitigate cache conflicts across different VMs. In this manner, not only can assigning specific ways to different VMs provide isolation, but higher priority VMs may be allocated a larger number of ways compared to a lower priority VM.

A kernel or hypervisor executing on server 100 or cache manager 102 in network interface device 150 could allocate a particular sized region of cache 152 to store contexts and/or associated data for a connection involving an application executed by server 100 based on determined RMID values. Note that reference to microservice, application, function, process, routine, service, virtual machine (VM), container, or accelerator device can be used interchangeably such that reference to one can refer to one or more of: a microservice, application, function, process, routine, service, VM, container, or accelerator device. Examples can apply to workloads and use-cases such as distributed Deep Learning, High Performance Computing (HPC).

In some cases, RMID values can be recalculated for contexts stored in QP cache 152 and an RMID value may change for a particular context, which may change an amount of ways or portions of QP cache 152 allocated to store the context as an RMID value assigned to a context could increase or decrease or a relative priority of an RMID value assigned to a context could increase or decrease relative to RMID values of other contexts stored in QP cache 152. For example, if additional contexts are added to QP cache 152, multiple contexts may share as same RMID value. Where RMID value assigned to a context could increase or decrease, tie breaks to allocate a higher RMID value or more cache to a context can be based on (in order of priority): connection reliability, network construct (e.g., congestion information), length of runtime of a flow or storage of a context, and application-defined level. For example, a tie break between multiple contexts with a same assigned RMID value can be based on a context being used in a reliable connection being assigned a higher value, but if the multiple contexts utilize a reliable connection, the next tie-breaker is network construct, and so forth. If the multiple contexts continue to tie for all factors, then the same priority can be assigned to all of the multiple contexts and cache space can be apportioned according to relative RMID priority levels to other contexts.

Invalidation of a QP context entry in a cache can occur upon a deletion, destruction, or termination of the QP. Eviction of contexts from the cache can occur based on one or more of: level of connection utilization (e.g., amount of access to the context over an amount of time), age-based (e.g., time the context has been stored in the cache), RMID priority level, a number of associated microservices associated with a given flow connection, or other factors.

Network interface device 150 can be implemented as one or more of: a remote direct memory access (RDMA)-enabled NIC, SmartNIC, network interface controller (NIC), SmartNIC, router, switch, forwarding element, infrastructure processing unit (IPU), or data processing unit (DPU). Network interface device 150 can be communicatively coupled to server 100 using a device interface, such as one or more of: Peripheral Component Interconnect express (PCIe), Compute Express Link (CXL), or others described herein.

Figure 2:
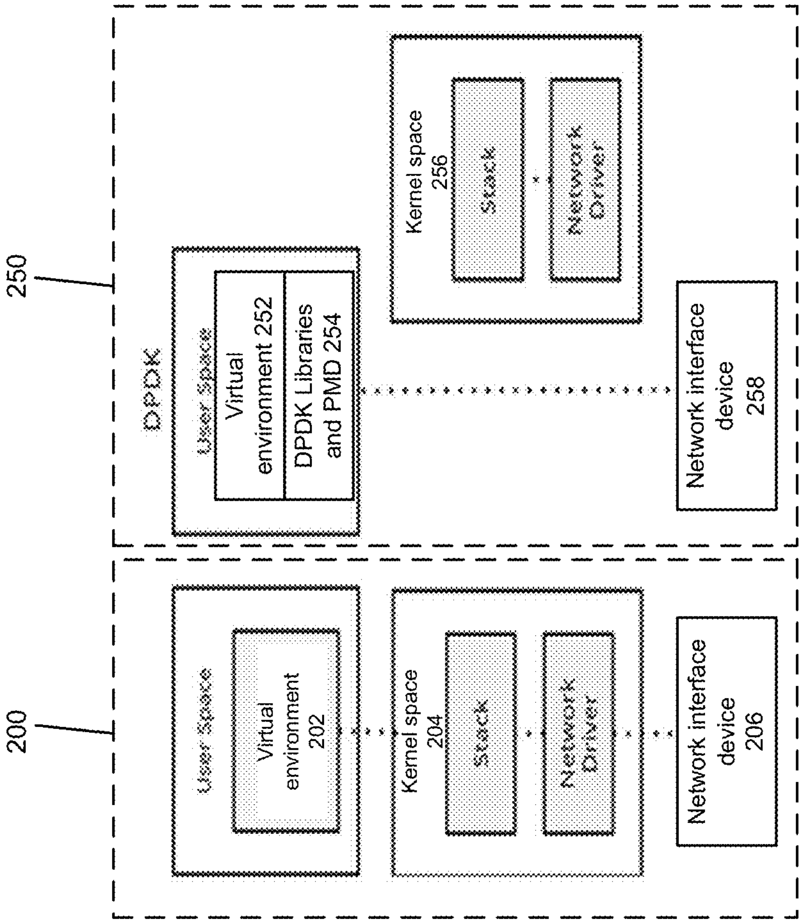
FIG. 2 depicts example of specification of application priority.

FIG. 2 depicts example of manner of specification of application priority. In configuration 200, a network connection is managed in kernel space (e.g., Linux kernel or hypervisor), and kernel 204 can construct connection context. Connection context can include RDMA send/receive queues (SQ) and (RQ), RDMA completion queue (CQ). Kernel 204 can interface with network interface device 206 to transmit or receive packets. Kernel 204 could receive input on how to categorize priority levels for different applications, processes, or virtual environments (e.g., VMs or containers). For example, a register (e.g., MSR) can include a configuration of a particular priority of the application, process, or virtual environment that is set prior to creation of an application, process, or VM or set dynamically at runtime of the application, process, or VM. A user can configure a class of service identifier (CLOSID) value or traffic class (TC) for a particular application, process, or virtual environment. Network TCs can refer to Virtual Lanes (VLs) in some examples. A kernel or hypervisor could read CLOSID or TC values upon launching or executing a particular application, process, or virtual environment and a cache manager, described herein, can determine an amount of cache to allocate to context or data of the application based at least on the specified CLOSID or TC, as well as one or more other factors described herein.

Configuration 250 shows another manner of specifying a priority level of particular application, process, or virtual environment. Data Plane Development Kit (DPDK) is a framework of user-space libraries and drivers to enable packet processing through kernel bypass and poll-mode driver (PMD) support. Applications based on the DPDK framework can construct network packets and transmit or receive packets via an interface with network interface device 258 directly, as opposed to using kernel space 256. DPDK libraries 254 can be used can construct network packets in the standard IPV4 structure format and specify to network interface device 258 or a cache manager a priority level.

Figure 3:
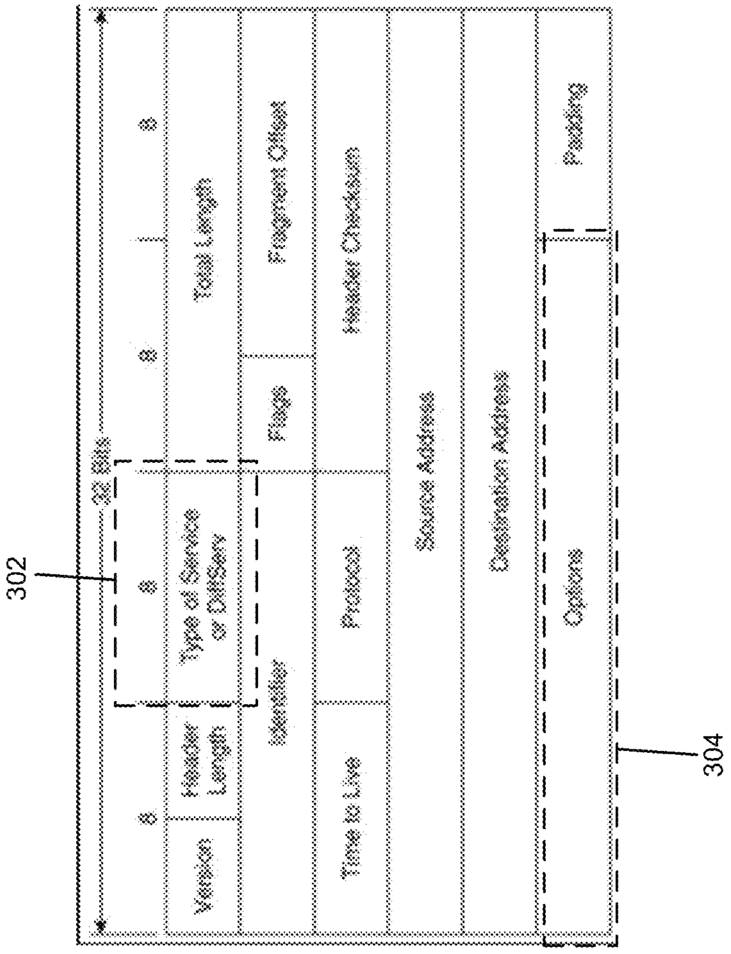
FIG. 3 depicts an example packet format that can be used to convey priority of an application.

FIG. 3 depicts an example packet format that can be used to convey priority of an application. A priority of a sender particular application, process, or virtual environment can be conveyed in a Type of Service Field (TC) 302, Options Field 304, or other field. For example, in response to receiving packets to transmit, a network interface device could parse the packet headers and extract the destination address and corresponding priority or TC. A cache manager in the host or network interface device can use the priority level, and one or more other factors described herein, to determine an RMID and a cache allocation for a particular application, process, or virtual environment as described herein. One or more destination addresses could be associated with a priority level or an RMID value.

Figure 4:
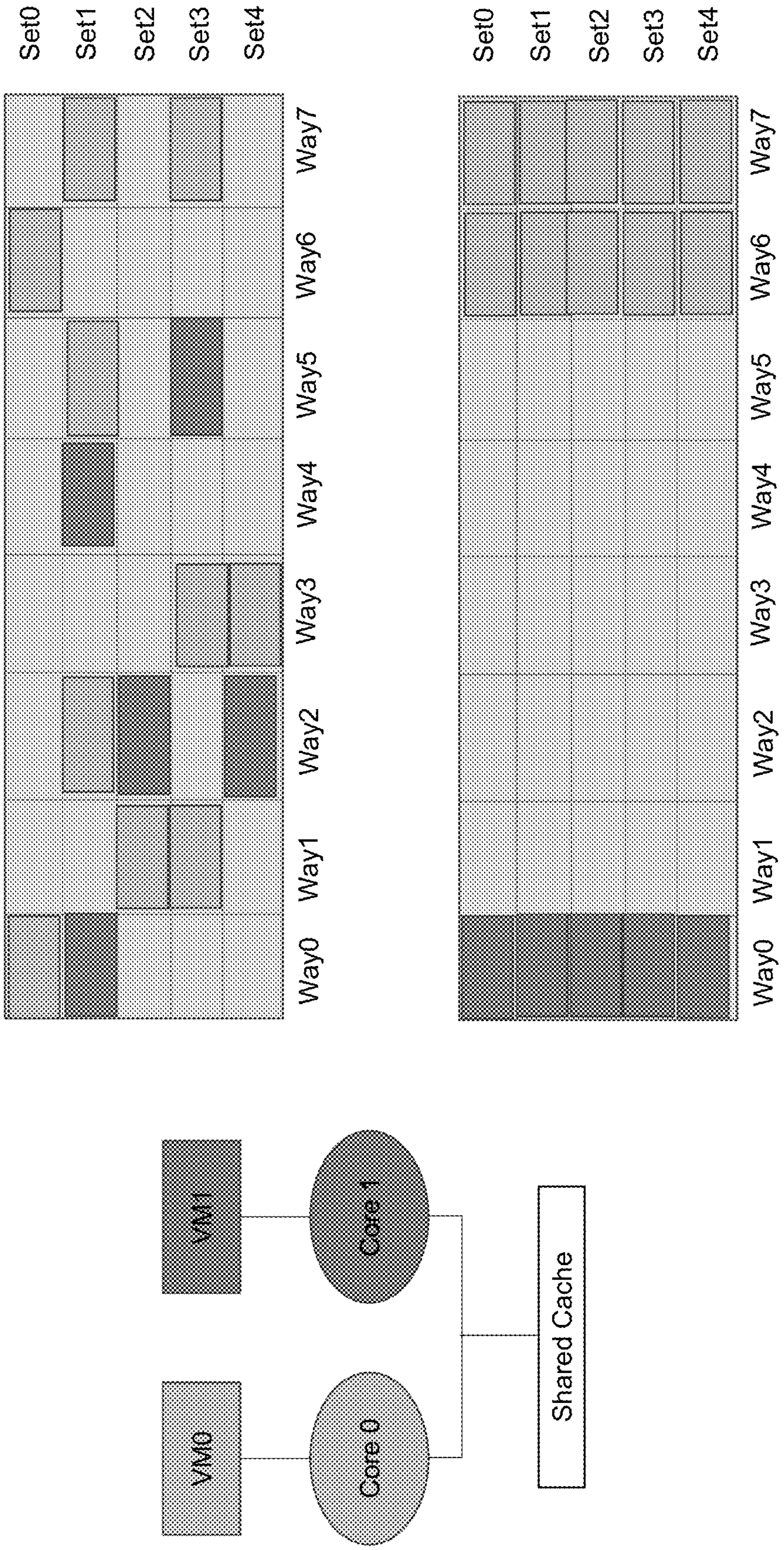
FIG. 4 depicts an example allocation of ways to virtual environments (e.g., VMs) or applications.

FIG. 4 depicts an example allocation of ways to virtual environments (e.g., VMs) or applications. For example, in a set associative cache, one or more ways of a set can be allocated to store contexts and/or data of a VM0 executing on core 0 and VM1 executing on core 1 based on RMID values as described herein. The cache can be any type such as but not limited to: direct-mapped cache, fully associative cache, or N-way-set-associative cache. Allocated cache ways can be subject to eviction policies described herein.

Figure 5:
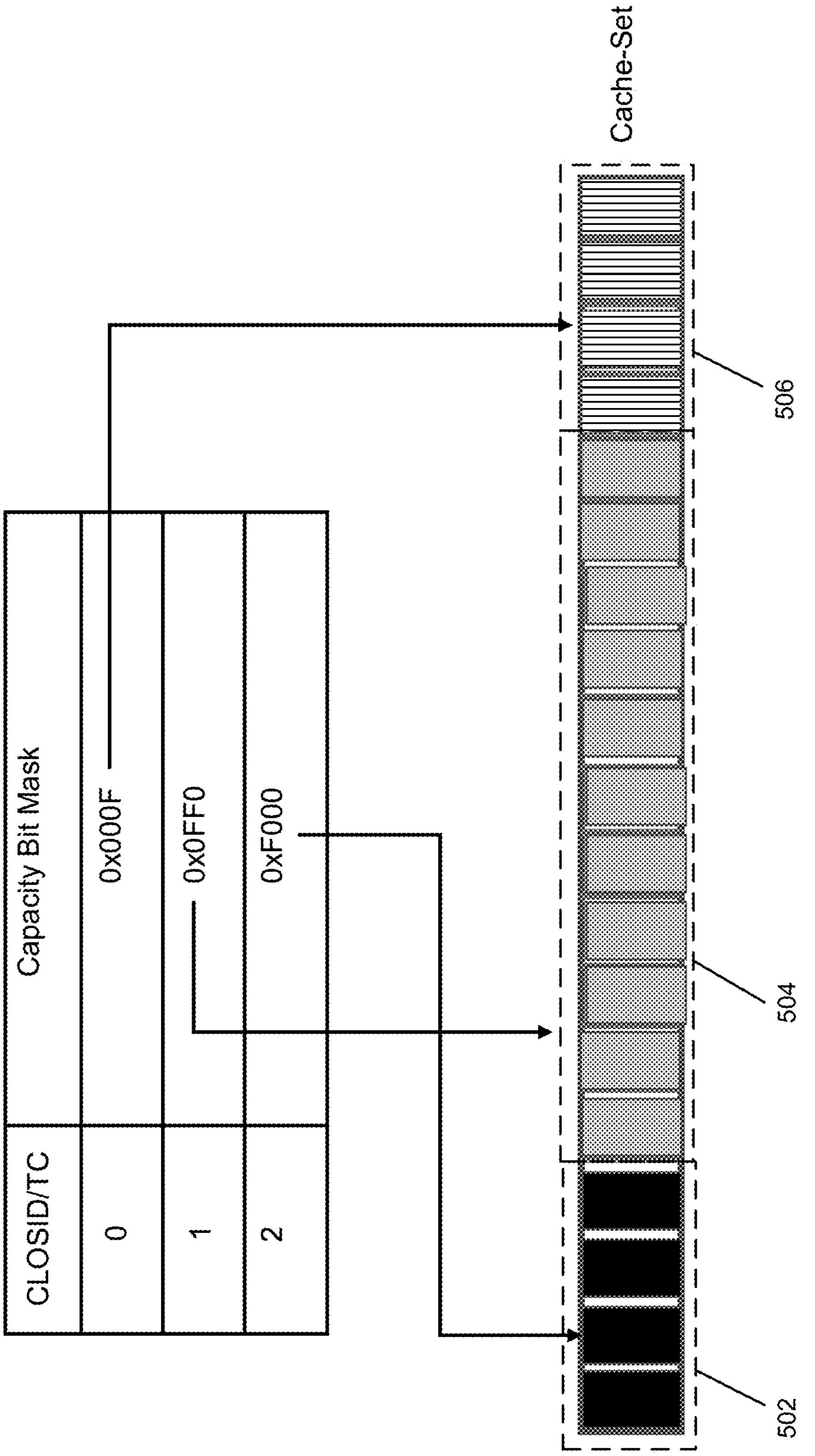
FIG. 5 depicts an example illustration of associating priorities or TCs with cache capacity.

FIG. 5 depicts an example illustration of associating priorities or TCs with cache capacity. Bit map or mask values can be used to identify one or more ways of a cache set that can be allocated per priority or TC. An RMID value can be mapped to different CLOSID/TC values, and cache access or utilization can be configured using RMID values to consider other factors beyond application priority in allocating cache.

In this example, bit mask or map for TC0 can specify 4 ways (502) of a set to allocate for context or data; bit mask or map for TC1 can specify 11 ways (504) of a set to allocate for context or data; and bit mask or map for TC2 can specify 4 ways (506) of a set to allocate for context or data.

Figure 6:
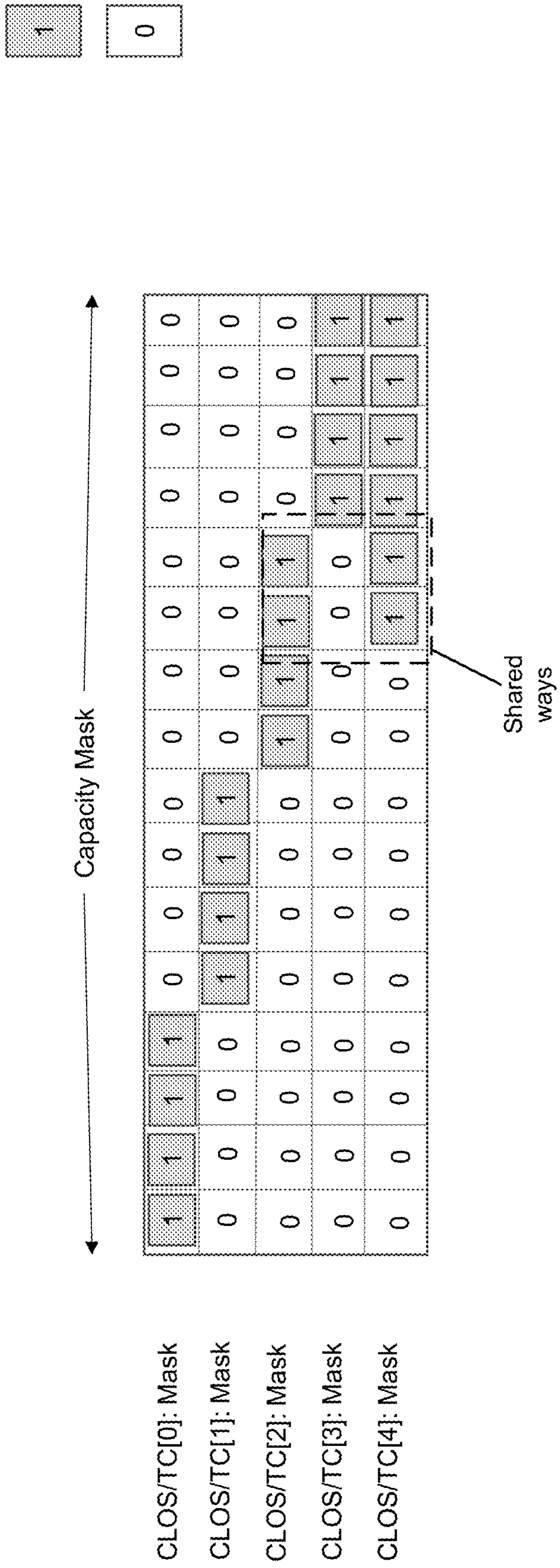
FIG. 6 depicts an example of way or partition sharing.

FIG. 6 depicts an example of way or partition sharing. A bit map or bit mask can indicate for a particular CLOS/TC level or RMID value, which specific ways and number of ways of a cache to allocate to store contexts and data associated with the CLOS/TC level or RMID value. As shown, some ways can be exclusively allocated to a particular CLOS/TC level or RMID value. Some ways can be shared among CLOS/TC levels 2 and 4 or different RMID values.

Figure 7:
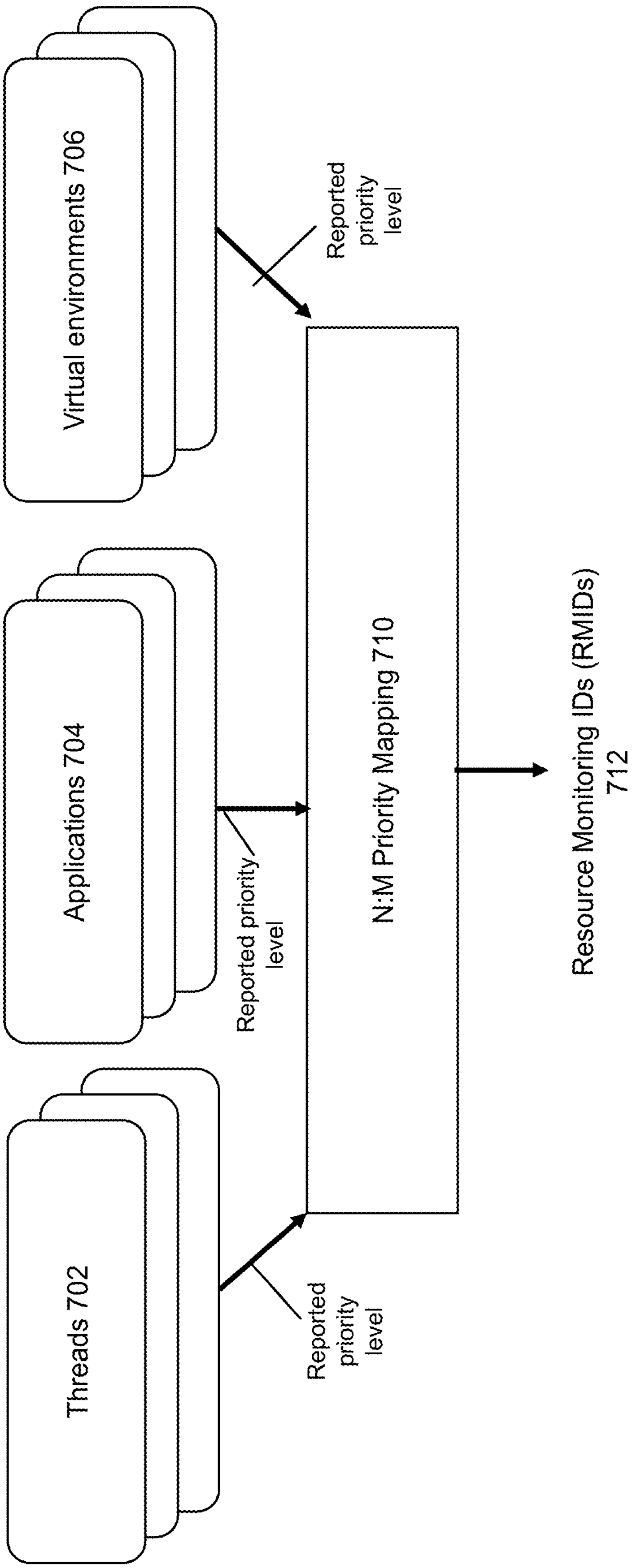
FIG. 7 depicts an example of mapping user-space processes to different RMID.

FIG. 7 depicts an example of mapping user-space processes to different RMID values. There could be more active QPs than number of RMID values. A ratio of number of QP to cache-way mapping can be N:M, where neither N or M is equal to 1. A cache manager, network interface control plane manager, kernel, Virtual Machine Monitor (VMM), or hypervisor can use generate an RMID 712 for a reported priority level for a particular QP using N:M priority mapping 710 based on considerations other than reported priority level described herein (e.g., connection type (e.g., reliable or unreliable connection), content transmitted (e.g., latency sensitive network congestion notifications payload and ACKs), length of runtime of a connection and associated microservice).

Figure 8:
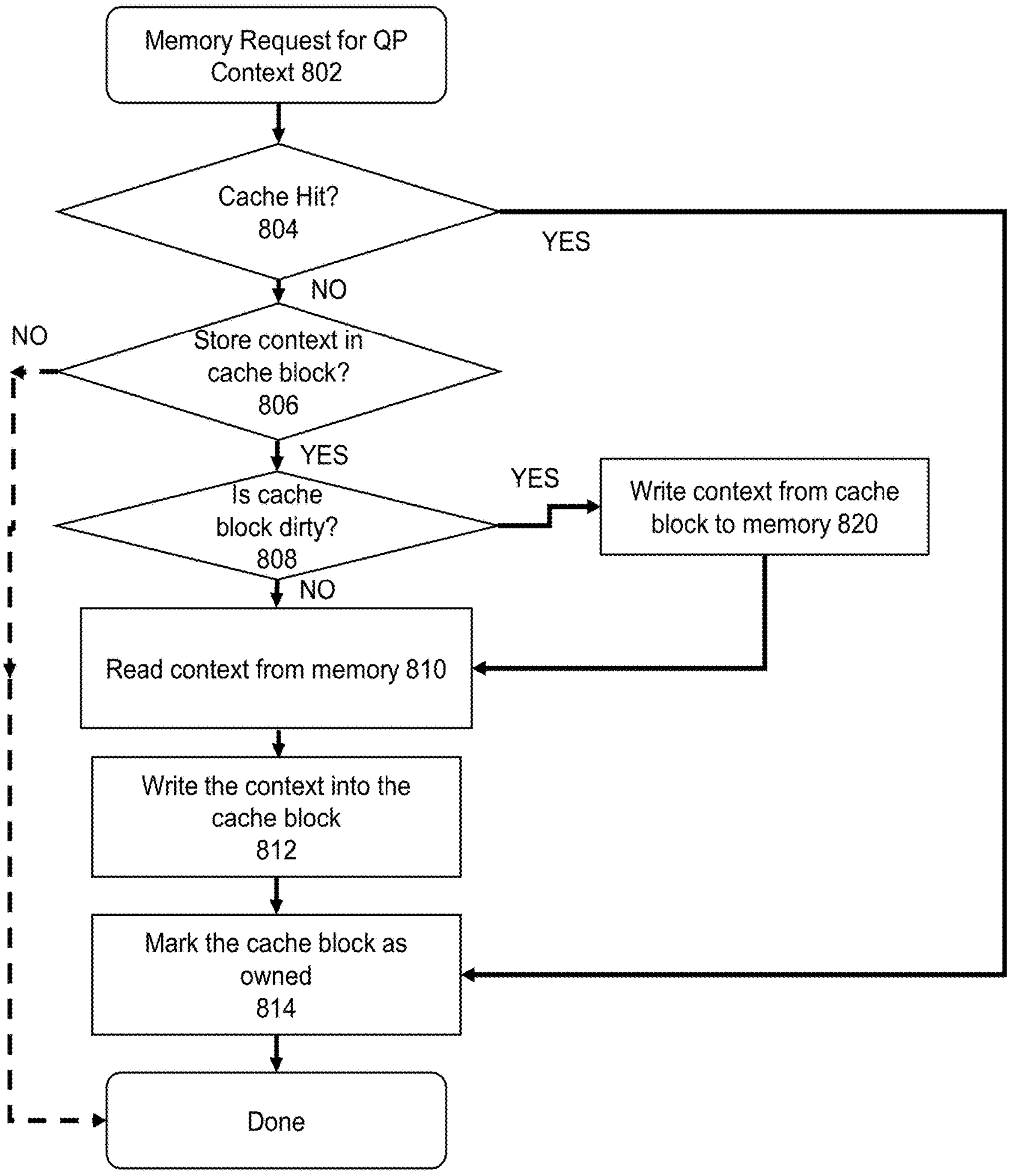
FIG. 8 depicts an example process to determine whether to allocate cache space to a context or not provide cache space for the context and identify the context as write no-allocate.

FIG. 8 depicts an example process to determine whether to allocate cache space to a context or not provide cache space for the context and identify the context as write no-allocate. At 802, a request to read a QP context from memory is received. At 804, a determination is made as to whether the QP context is stored in a QP cache. The determination can be made by one or more of: a cache manager, network interface control plane manager, or kernel, Virtual Machine Monitor (VMM), or hypervisor. If the QP context is stored in the QP cache, a cache hit, the process can continue to 814. If the QP context is not stored in the QP cache, a cache miss, the process can continue to 806.

At 806, a determination can be made if the context can be stored in a cache block of the QP cache. For example, a cache block can be a way or multiple ways of the QP cache. For example, the context can be stored in a cache block if the cache has capacity to store the context (either free space or after context eviction) and based on consideration of an expected time the context will be stored in the cache and/or a reliability of a connection associated with the context. An unreliable connection may fail and be short lived. If the expected connection time is equal to or less than a threshold level or the connection is unreliable (e.g., as identified in a configuration by a software runtime management or interfaces exposed to the end-user application)), a determination can be made to not store the context into a cache block and instead to treat the context as write no-allocate with no cache allocation. If the expected time is more than the threshold level and the connection is considered reliable, the process can identify a free block or identify content of a cache block to evict and the process can continue to 808.

At 808, a determination can be made if content of a cache block identified to be evicted is marked as dirty. For example, the cache block identified to be evicted can be identified for eviction based on various eviction policies described herein. A cache block and its content can be marked as dirty if the data is modified in the cache but not written to memory or storage. If the content of the identified cache block is not marked dirty, the process can continue to 810. If the content of the identified cache block to be evicted is marked dirty, the process can continue to 820, where the evicted context from the cache block can be copied to memory. Note that 808 may not be performed if no content is to be evicted from the cache.

At 810, the context requested at 802 can be read from memory such as a local memory device or a remote memory device using a network connection. At 812, the context requested at 802 can be written to the identified cache block that was identified to be evicted. At 814, the cache block that stored the context requested at 802 can be marked as owned and storing context.

Figure 9:
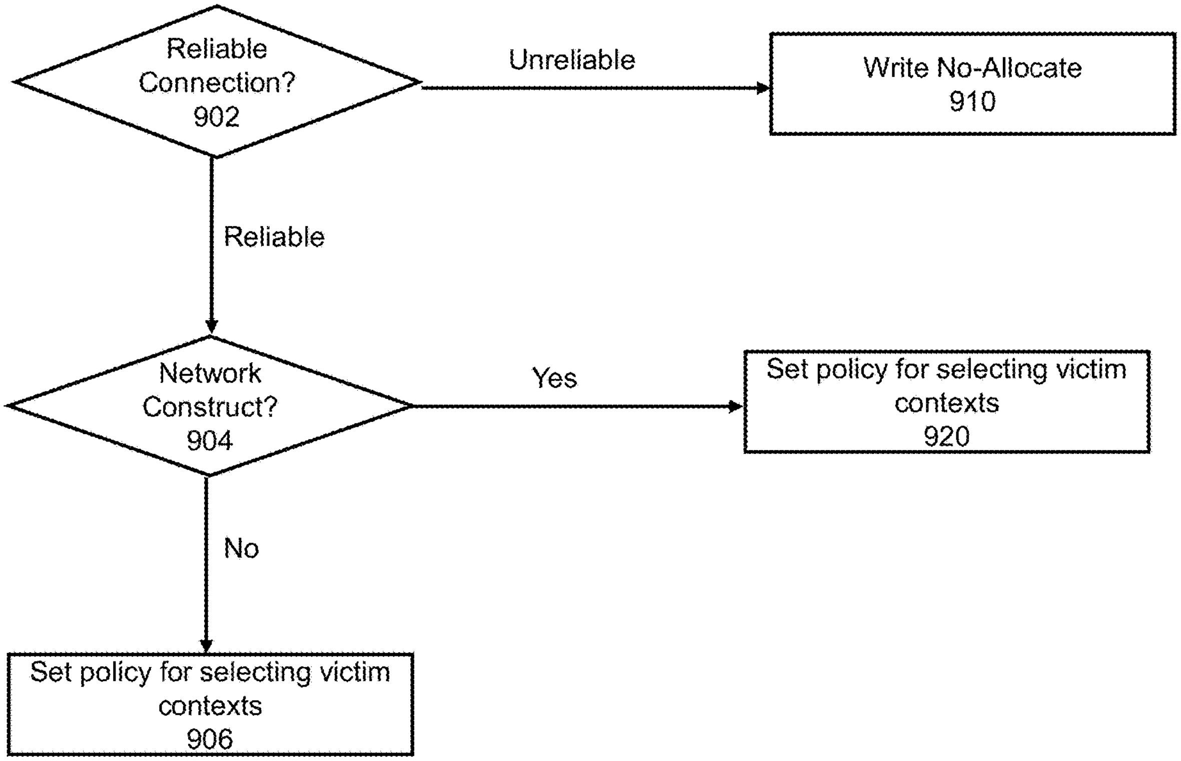
FIG. 9 depicts an example cache allocation and eviction process.

FIG. 9 depicts an example cache allocation and eviction process. At 902, a determination can be made if the connection is reliable. In some examples, a determination that a connection is reliable can be made based on use or non-use of a reliable transport protocol such as TCP, User UDP, QUIC, RoCE. If the connection is deemed to be reliable, the process can continue to 904. If the connection is deemed to be unreliable, the process can continue to 910, where the context for the connection can be written to memory and read from memory but not stored in a cache.

At 904, a determination can be made if the connection transports network constructs such as congestion information. Congestion protocols such as Data Center Quantized Congestion Notification (DCQCN), High-Precision Congestion Control (HPCC), Receiver-based High-Precision Congestion Control (RX-HPCC) are utilizing network constructs such as Congestion Notification Packets (CNPs), In-Network-Telemetry (INT), and Round-Trip-Time (RTT) probes in order to modulate dynamic network congestion. These network constructs can be highly sensitive to network latency or jitter and can be transmitted on a separate channel or associated network connection when possible, to reduce network delays. If the connection carries network constructs, the process can continue to 920 to set an eviction policy at random. If the connection does not carry network constructs, the process can continue to 906 to set an eviction policy at weighted selection for network constructs, least recently used (LRU), Least-Frequently Used (LFU) when the network communication pattern is bursty or exhibits high temporal reuse, or a random selection for non-network constructs.

Figure 10:
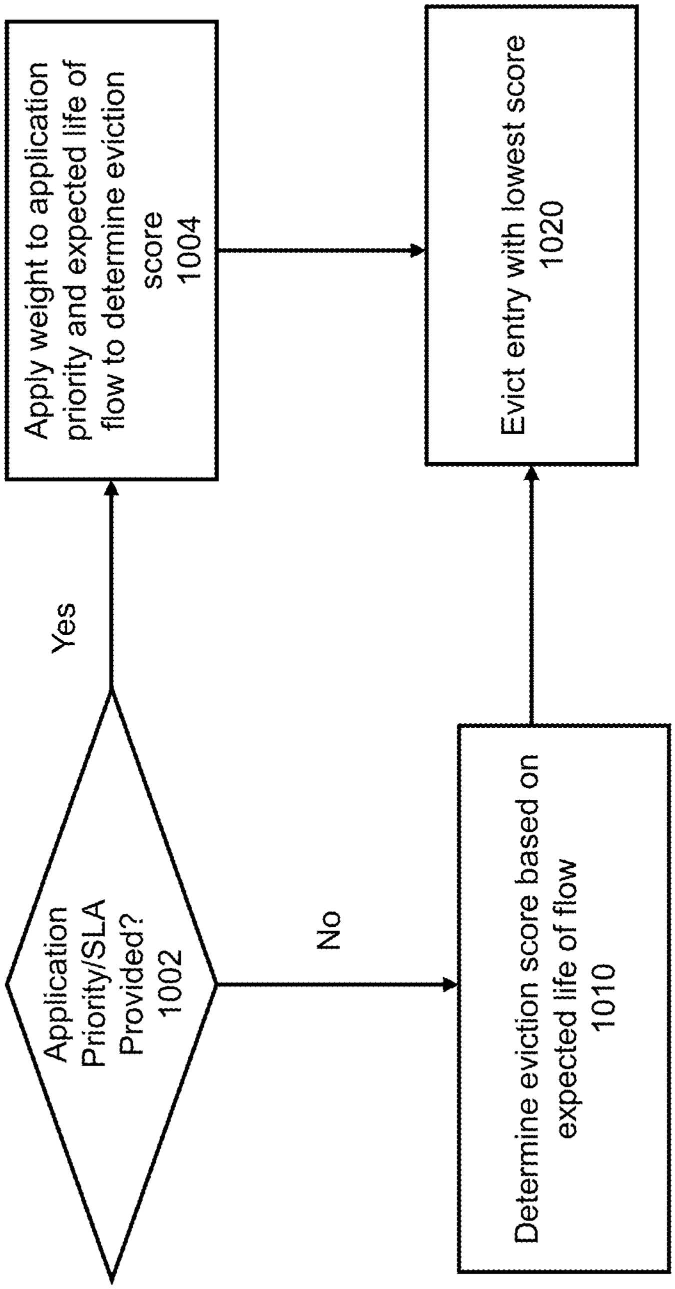
FIG. 10 depicts an example process to determine a context to evict.

FIG. 10 depicts an example process to determine which context to evict based on an eviction score. For example, an eviction score can be assigned based on: ((priority level*weight(priority))+(age-of-flow*weight(age)))/maximum_eviction_score. For example, a score can be allocated to a context or cache region (e.g., one or more ways) to determine whether to evict the context or contexts to memory and free cache space. At 1002, a determination can be made if an application priority level is provided. A priority level can be a TC or CLOSID. If the application priority level is provided, the process can continue to 1004. If the application priority level is not provided, the process can continue to 1010.

At 1004, the process can apply a weight to the application priority and expected life of a flow associated with the context that is stored in the cache to determine an eviction score for one or more contexts and corresponding way(s) in the cache. For example, 50/50 or even weighting of priority and expected life can be applied to determine the eviction score. At 1010, the process can determine an eviction score for one or more contexts and corresponding way(s) in the cache based on the expected life of the flow and assign zero weight to a priority level of the application because no priority level is available. At 1020, the context entry or corresponding way or ways with the lowest eviction score can be selected for eviction.

Figure 11:
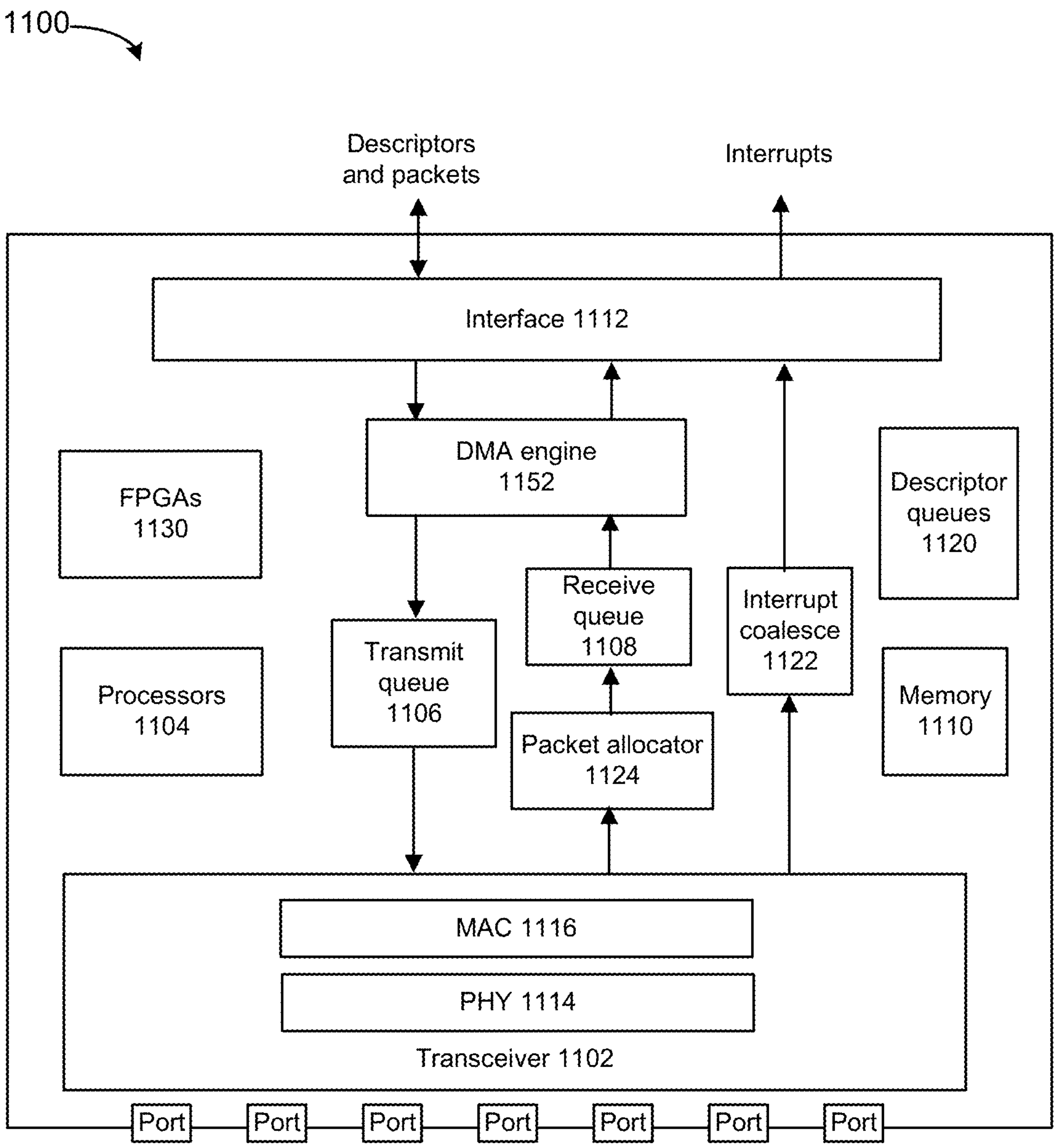
FIG. 11 depicts a network interface device.

FIG. 11 depicts a network interface device. Various processor resources in the network interface can be used to allocate one or more cache ways to store contexts or determine which context to evict, as described herein. In some examples, network interface 1100 can be implemented as a network interface controller, network interface card, network device, network interface device, a host fabric interface (HFI), or host bus adapter (HBA), and such examples can be interchangeable. Network interface 1100 can be coupled to one or more servers using a bus, PCIe, CXL, or Double Data Rate (DDR) standards. Network interface 1100 may be embodied as part of a system-on-a-chip (SoC) that includes one or more processors or included on a multichip package that also contains one or more processors.

Some examples of network device 1100 are part of an Infrastructure Processing Unit (IPU) or data processing unit (DPU) or utilized by an IPU or DPU. An xPU can refer at least to an IPU, DPU, graphics processing unit (GPU), general purpose GPU (GPGPU), or other processing units (e.g., accelerator devices). An IPU or DPU can include a network interface with one or more programmable pipelines or fixed function processors to perform offload of operations that could have been performed by a central processing unit (CPU). The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1100 can include transceiver 1102, processors 1104, transmit queue 1106, receive queue 1108, memory 1110, and bus interface 1112, and DMA engine 1152. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include PHY circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to perform MAC address filtering on received packets, process MAC headers of received packets by verifying data integrity, remove preambles and padding, and provide packet content for processing by higher layers. MAC circuitry 1116 can be configured to assemble data to be transmitted into packets, that include destination and source addresses along with network control information and error detection hash values.

Processors 1104 can be any combination of a: processor, core, graphics processing unit (GPU), field programmable gate array (FPGA), application specific integrated circuit (ASIC), or other programmable hardware device that allow programming of network interface 1100. For example, a "smart network interface" or SmartNIC can provide packet processing capabilities in the network interface using processors 1104.

Processors 1104 can include a programmable processing pipeline that is programmable by P4, C, Python, Broadcom Network Programming Language (NPL), or x86 compatible executable binaries or other executable binaries. A programmable processing pipeline can include one or more match-action units (MAUs) that can be configured to allocate cache space to a context and determine a context to evict from a cache, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 1124 can provide distribution of received packets for processing by multiple CPUs or cores using timeslot allocation described herein or receive side scaling (RSS). When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1152 can copy a packet header, packet payload, and/or descriptor directly from host memory to the network interface or vice versa, instead of copying the packet to an intermediate buffer at the host and then using another copy operation from the intermediate buffer to the destination buffer.

Memory 1110 can be any type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Bus interface 1112 can provide an interface with host device (not depicted). For example, bus interface 1112 can be compatible with PCI, PCI Express, PCI-x, Serial ATA, and/or USB compatible interface (although other interconnection standards may be used).

Figure 12:
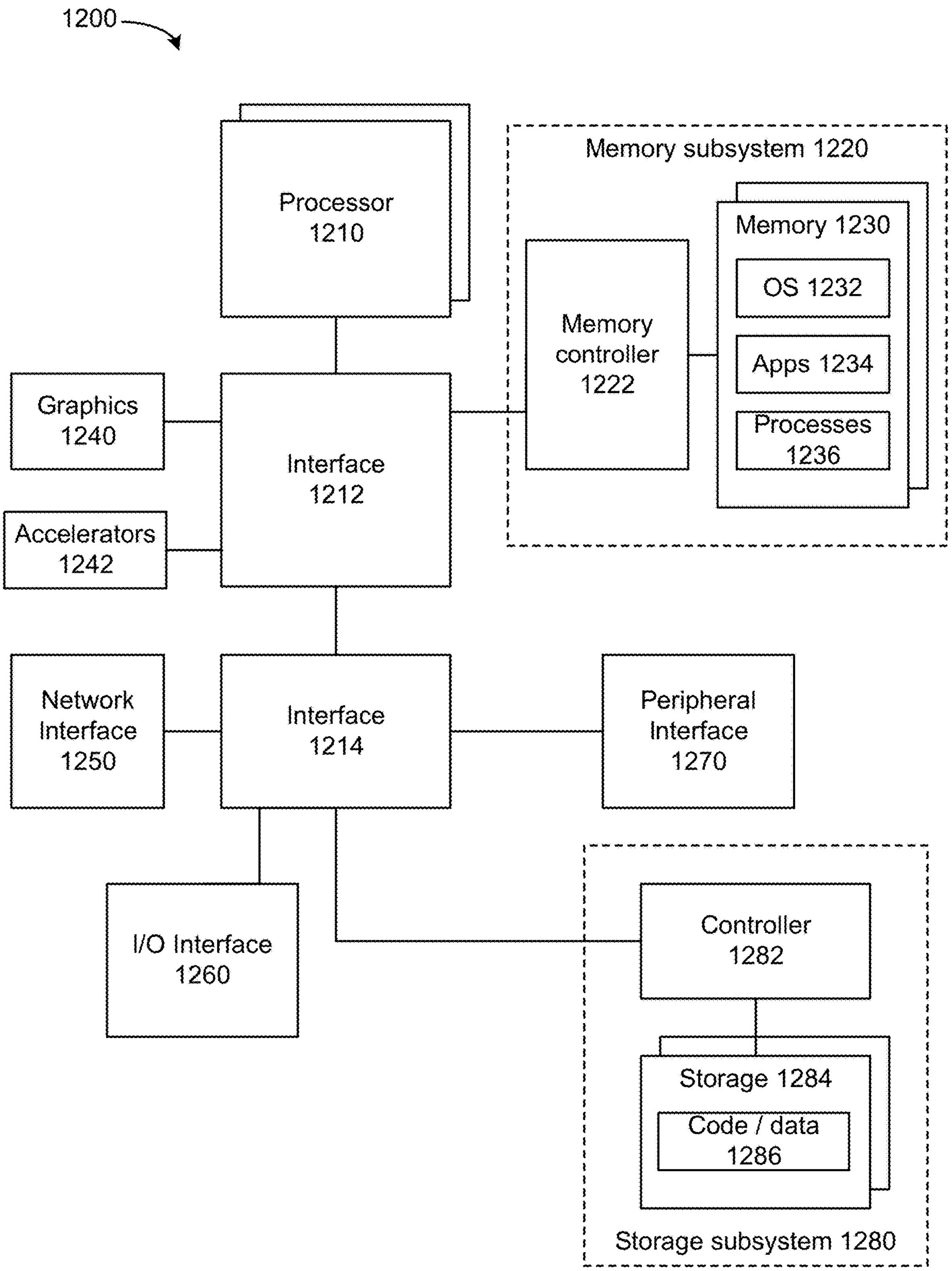
FIG. 12 depicts a system.

FIG. 12 depicts an example computing system. Various embodiments can use components of system 1000 (e.g., processor 1210, network interface 1250, and so forth) to allocate cache space for QP context or evict QP context, as described herein. System 1200 includes processor 1210, which provides processing, operation management, and execution of instructions for system 1200. Processor 1210 can include any type of microprocessor, central processing unit (CPU), graphics processing unit (GPU), processing core, or other processing hardware to provide processing for system 1200, or a combination of processors. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1200 includes interface 1212 coupled to processor 1210, which can represent a higher speed interface or a high throughput interface for system components that needs higher bandwidth connections, such as memory subsystem 1220 or graphics interface components 1240, or accelerators 1242. Interface 1212 represents an interface circuit, which can be a standalone component or integrated onto a processor die. Where present, graphics interface 1240 interfaces to graphics components for providing a visual display to a user of system 1200. In one example, graphics interface 1240 can drive a high definition (HD) display that provides an output to a user. High definition can refer to a display having a pixel density of approximately 120 PPI (pixels per inch) or greater and can include formats such as full HD (e.g., 1280p), retina displays, 4K (ultra-high definition or UHD), or others. In one example, the display can include a touchscreen display. In one example, graphics interface 1240 generates a display based on data stored in memory 1230 or based on operations executed by processor 1210 or both. In one example, graphics interface 1240 generates a display based on data stored in memory 1230 or based on operations executed by processor 1210 or both.

Accelerators 1242 can be a fixed function or programmable offload engine that can be accessed or used by a processor 1210. For example, an accelerator among accelerators 1242 can provide compression (DC) capability, cryptography services such as public key encryption (PKE), cipher, hash/authentication capabilities, decryption, or other capabilities or services. In some embodiments, in addition or alternatively, an accelerator among accelerators 1242 provides field select controller capabilities as described herein. In some cases, accelerators 1242 can be integrated into a CPU socket (e.g., a connector to a motherboard or circuit board that includes a CPU and provides an electrical interface with the CPU). For example, accelerators 1242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1242 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1220 represents the main memory of system 1200 and provides storage for code to be executed by processor 1210, or data values to be used in executing a routine. Memory subsystem 1220 can include one or more memory devices 1230 such as read-only memory (ROM), flash memory, one or more varieties of random access memory (RAM) such as DRAM, or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

In some examples, OS 1232 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 1250 or a cache manager to allocate cache space for a context and/or identify one or more contexts to evict to make space to store a context, as described herein. For example, configuration can take place using one or more of a configuration file, a register write, or application program interface (API) to turn on or turn off operation of the cache manager to allocate cache space for a context and/or identify one or more contexts to evict to make space to store a context, as described herein.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1200 includes interface 1214, which can be coupled to interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can transmit data to a device that is in the same data center or rack or a remote device, which can include sending data stored in memory. Network interface 1250 can receive data from a remote device, which can include storing received data into memory.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (e.g., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (e.g., the value or state of the data is indeterminate if power is interrupted to system 1200). In one example, storage subsystem 1280 includes controller 1282 to interface with storage 1284. In one example controller 1282 is a physical part of interface 1214 or processor 1210 or can include circuits or logic in both processor 1210 and interface 1214.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1200. More specifically, power source typically interfaces to one or multiple power supplies in system 1200 to provide power to the components of system 1200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1200 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers can be interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising: a host interface, a direct memory access (DMA) engine, and circuitry to allocate a region in a cache to store a context of a connection.

Example 2 includes one or more examples, wherein the circuitry is to allocate a region in a cache to store a context of a connection based on connection reliability and wherein connection reliability comprises use of a reliable transport protocol or non-use of a reliable transport protocol.

Example 3 includes one or more examples, wherein the circuitry is to allocate a region in a cache to store a context of a connection based on expected length of runtime of the connection and wherein the expected length of runtime of the connection is based on a historic average amount of time the context for the connection was stored in the cache.

Example 4 includes one or more examples, wherein the circuitry is to allocate a region in a cache to store a context of a connection based on content transmitted and wherein the content transmitted comprises congestion messaging payload or acknowledgement.

Example 5 includes one or more examples, wherein the circuitry is to allocate a region in a cache to store a context of a connection based on application-specified priority level and wherein the application-specified priority level comprises an application-specified traffic class level or class of service level.

Example 6 includes one or more examples, wherein a size of the region is based on a priority level of the context and wherein the priority level of the context is based on a length of runtime of the connection, followed by content transmitted, followed by length of runtime of the connection, and followed by application-specified priority level.

Example 7 includes one or more examples, wherein the circuitry is to determine an eviction policy for the context based on one or more of: time the context is stored in the cache and/or number of times the context has been accessed from the cache.

Example 8 includes one or more examples, wherein the circuitry comprises resource director technology (RDT) and/or Platform Quality of Service (QoS).

Example 9 includes one or more examples, wherein the context is associated with a remote direct memory access (RDMA) queue pair.

Example 10 includes one or more examples, wherein the circuitry is to allocate zero cache to a context of a short-lived function.

Example 11 includes one or more examples, wherein the network interface device comprises one or more of: remote direct memory access (RDMA)-enabled NIC, SmartNIC, network interface controller (NIC), SmartNIC, router, switch, forwarding element, infrastructure processing unit (IPU), or data processing unit (DPU).

Example 12 includes one or more examples, and includes a server communicatively coupled to the host interface, wherein the server is to configure the circuitry to allocate a region in a cache to store a context of a connection.

Example 13 includes one or more examples, and includes a method that includes at a network interface device, allocating a region in a cache to store a context of a connection.

Example 14 includes one or more examples, wherein the allocating a region in a cache to store a context of a connection is based on connection reliability and wherein the connection reliability comprises use of a reliable transport protocol or non-use of a reliable transport protocol.

Example 15 includes one or more examples, wherein the allocating a region in a cache to store a context of a connection is based on expected length of runtime of the connection and wherein the expected length of runtime of the connection is based on a historic average amount of time the context for the connection was stored in the cache.

Example 16 includes one or more examples, wherein the allocating a region in a cache to store a context of a connection is based on content transmitted and wherein the content transmitted comprises congestion messaging payload or acknowledgement.

Example 17 includes one or more examples, wherein a size of the region is based on a priority level of the context and wherein the priority level of the context is based on length of runtime of the connection, followed by content transmitted, followed by length of runtime of the connection, and followed by application-specified priority level.

Example 18 includes one or more examples, and includes a computer-readable medium comprising instructions stored thereon, that if executed by one or more processors, cause the one or more processors to: execute a driver to configure a network interface device to allocate a region in a cache to store a context of a connection.

Example 19 includes one or more examples, wherein the allocate a region in a cache to store a context of a connection is based on connection reliability and expected length of runtime of the connection and wherein: the connection reliability comprises use of a reliable transport protocol or non-use of a reliable transport protocol and the expected length of runtime of the connection is based on a historic average amount of time the context for the connection was stored in the cache.

Example 20 includes one or more examples, wherein a size of the region is based on a priority level of the context and wherein the priority level of the context is based on length of runtime of the connection, followed by content transmitted, followed by length of runtime of the connection, and followed by application-specified priority level.

What is claimed is:

1. An apparatus comprising:

a network interface device comprising:

a host interface, a direct memory access (DMA) engine, a network interface, and circuitry to allocate a first region in a cache to store a context of a connection and allocate a second region in the cache to store a second context, wherein:

the first region of the cache is allocated to store data associated with a first Resource Manager Identifier (RMID) value, the second region of the cache is allocated to store data associated with a second RMID value, the circuitry is to apply an eviction policy for the first and second regions of the cache based on priority levels associated with the first RMID value and the second RMID value, the priority level associated with the first RMID value is higher than the priority level associated with the second RMID value, and the eviction policy for the second region of the cache is to permit eviction of data from the first region at a higher rate than a rate of eviction permitted for the first region of the cache.

2. The apparatus of claim 1, wherein the circuitry is to allocate the first region in the cache to store the context of the connection based on connection reliability and wherein the connection reliability comprises use of a reliable transport protocol or non-use of a reliable transport protocol, wherein the reliable transport protocol provides re-transmission of a packet based on indication of non-receipt of the packet.

3. The apparatus of claim 1, wherein the circuitry is to allocate the first region in the cache to store the context of the connection based on expected length of runtime of the connection and wherein the expected length of runtime of the connection is based on a historic average amount of time the context for the connection was stored in the cache, and wherein the context comprises connection state and includes one or more of: a most recently received packet sequence number, next expected received packet sequence number, current producer index associated with pointer to a receive queue (RQ) in which a descriptor is to be written, current head index associated with a pointer to the RQ from which a descriptor is to be read, a Completion Queue (CQ) context that is to specify a current producer index associated with a pointer to the CQ in which a descriptor is to be written, current consumer index associated with a pointer to the CQ from which a descriptor is to be read, a data structure that is to define a starting address and size of application data buffer region in host memory and access rights, physical page addresses associated with a memory region, type of message to be transmitted, total size of message, and/or references to source and/or destination memory region that data is to be sourced-from or sunk-to.

4. The apparatus of claim 1, wherein the circuitry is to allocate the first region in the cache to store the context of the connection based on content transmitted and wherein the content transmitted comprises congestion messaging payload that identifies congestion in a network interface device and acknowledgement of receipt of a transmitted packet.

5. The apparatus of claim 1, wherein the circuitry is to allocate the first region in the cache to store the context of the connection based on application-specified priority level, wherein the application-specified priority level comprises an application-specified traffic class level or class of service level, and wherein the context comprises connection state and includes one or more of: a most recently received packet sequence number, next expected received packet sequence number, current producer index associated with pointer to a receive queue (RQ) in which a descriptor is to be written, current head index associated with a pointer to the RQ from which a descriptor is to be read, a Completion Queue (CQ) context that is to specify a current producer index associated with a pointer to the CQ in which a descriptor is to be written, current consumer index associated with a pointer to the CQ from which a descriptor is to be read, a data structure that is to define a starting address and size of application data buffer region in host memory and access rights, physical page addresses associated with a memory region, type of message to be transmitted, total size of message, and/or references to source and/or destination memory region that data is to be sourced-from or sunk-to.

6. The apparatus of claim 1, wherein a size of the first region is based on a priority level of the context, wherein the priority level of the context is based on a length of runtime of the connection as a first priority level, followed by content transmitted as a second priority level, followed by length of runtime of the connection, and followed by application-specified priority level as a third priority level, and wherein the first priority level is higher than the second priority level and the second priority level is higher than the third priority level.

7. The apparatus of claim 1, wherein the circuitry is to determine an eviction policy for the context based on one or more of: time the context is stored in the cache and/or number of times the context has been accessed from the cache.

8. The apparatus of claim 1, wherein the circuitry comprises resource director technology (RDT) and/or Platform Quality of Service (QoS).

9. The apparatus of claim 1, wherein the context is associated with a remote direct memory access (RDMA) queue pair.

10. The apparatus of claim 1, wherein the circuitry is to allocate zero cache to a context of a short-lived function.

11. The apparatus of claim 1, wherein the network interface device comprises one or more of: remote direct memory access (RDMA)-enabled NIC, SmartNIC, network interface controller (NIC), SmartNIC, router, switch, forwarding element, infrastructure processing unit (IPU), or data processing unit (DPU).

12. The apparatus of claim 1, comprising a server communicatively coupled to the host interface, wherein the server is to configure the circuitry to allocate a region in a cache to store the context of a connection.

13. A method comprising:

a network interface device performing:

allocating a first region in a cache to store a context of a connection;

allocating a second region in the cache to store a second context; and applying an eviction policy for the first and second regions of the cache based on priority levels associated with a first Resource Manager Identifier (RMID) value and a second RMID value, wherein:

the first region of the cache is allocated to store data associated with the first RMID value, the second region of the cache is allocated to store data associated with the second RMID value, the priority level associated with the first RMID value is higher than the priority level associated with the second RMID value, and the eviction policy for the second region of the cache permits eviction of data from the first region at a higher rate than a rate of eviction permitted for the first region of the cache.

14. The method of claim 13, wherein the allocating the first region in the cache to store the context of the connection is based on connection reliability and wherein the connection reliability comprises use of a reliable transport protocol or non-use of a reliable transport protocol and wherein the context comprises connection state and includes three or more of: a most recently received packet sequence number, next expected received packet sequence number, current producer index associated with pointer to a receive queue (RQ) in which a descriptor is to be written, current head index associated with a pointer to the RQ from which a descriptor is to be read, a Completion Queue (CQ) context that is to specify a current producer index associated with a pointer to the CQ in which a descriptor is to be written, current consumer index associated with a pointer to the CQ from which a descriptor is to be read, a data structure that is to define a starting address and size of application data buffer region in host memory and access rights, physical page addresses associated with a memory region, type of message to be transmitted, total size of message, and/or references to source and/or destination memory region that data is to be sourced-from or sunk-to.

15. The method of claim 13, wherein the allocating the first region in the cache to store the context of the connection is based on expected length of runtime of the connection and wherein the expected length of runtime of the connection is based on a historic average amount of time the context for the connection was stored in the cache.

16. The method of claim 13, wherein the allocating the first region in the cache to store the context of the connection is based on content transmitted and wherein the content transmitted comprises congestion messaging payload or acknowledgement of receipt of a transmitted packet.

17. The method of claim 13, wherein a size of the first region is based on a priority level of the context, wherein the priority level of the context is based on a length of runtime of the connection as a first priority level, followed by content transmitted as a second priority level, followed by length of runtime of the connection, and followed by application-specified priority level as a third priority level, and wherein the first priority level is higher than the second priority level and the second priority level is higher than the third priority level.

18. At least one non-transitory computer-readable medium comprising instructions stored thereon, that if executed by one or more processors, cause the one or more processors to:

execute a driver to configure a network interface device to:

allocate a first region in a cache to store a context of a connection;

allocate a second region in the cache to store a second context, and apply an eviction policy for the first and second regions of the cache based on priority levels associated with a first Resource Manager Identifier (RMID) value and a second RMID value, wherein:

the first region of the cache is allocated to store data associated with the first RMID value, the second region of the cache is allocated to store data associated with the second RMID value, the priority level associated with the first RMID value is higher than the priority level associated with the second RMID value, and the eviction policy for the second region of the cache is to permit eviction of data from the first region at a higher rate than a rate of eviction permitted for the first region of the cache.

19. The computer-readable medium of claim 18, wherein the allocate the first region in the cache to store the context of the connection is based on connection reliability and expected length of runtime of the connection and wherein:

the connection reliability comprises use of a reliable transport protocol or non-use of a reliable transport protocol, the expected length of runtime of the connection is based on a historic average amount of time the context for the connection was stored in the cache, and the context comprises connection state and includes four or more of: a most recently received packet sequence number, next expected received packet sequence number, current producer index associated with pointer to a receive queue (RQ) in which a descriptor is to be written, current head index associated with a pointer to the RQ from which a descriptor is to be read, a Completion Queue (CQ) context that is to specify a current producer index associated with a pointer to the CQ in which a descriptor is to be written, current consumer index associated with a pointer to the CQ from which a descriptor is to be read, a data structure that is to define a starting address and size of application data buffer region in host memory and access rights, physical page addresses associated with a memory region, type of message to be transmitted, total size of message, and/or references to source and/or destination memory region that data is to be sourced-from or sunk-to.

20. The computer-readable medium of claim 18, wherein a size of the region is based on a priority level of the context, wherein the priority level of the context is based on a length of runtime of the connection as a first priority level, followed by content transmitted as a second priority level, followed by length of runtime of the connection, and followed by application-specified priority level as a third priority level, and wherein the first priority level is higher than the second priority level and the second priority level is higher than the third priority level.

* * * * *